United States Patent Office 2,827,405
Patented Mar. 18, 1958

2,827,405

METHOD OF DESHEATHING OF URANIUM FUEL RODS

Robert J. Evans, Deep River, Ontario, and Richard F. Bader, Kitchener, Ontario, Canada, assignors to Atomic Energy of Canada Limited, Ottawa, Ontario, Canada, a Canadian company No Drawing. Application May 9, 1956
Serial No. 583,631

5 Claims. (Cl. 148—4)

This invention relates to the desheathing of fuel rods clad in sheaths made of zirconium or its alloys.

Uranium metal bars or rods sheathed with zirconium or an alloy of it provide fuel elements for water-cooled power reactors. When the sheath is bonded to the uranium a chemical method is required to separate the sheath from the uranium in order that the latter may be processed for reuse.

The object of the present invention is to provide an effective method for removing the zirconium sheath from the used fuel rod.

In accordance with the invention the clad or sheathed uranium fuel rod is treated with steam at a temperature of not substantially less than 250° C., preferably between 340 and 380° C., to change the uranium core to oxide form and thus break the bond between the core and sheath. The separation is slow when only the ends of the core are subjected to the steam. Accordingly the sheath is punctured or scored to expose the uranium core at a plurality of points. The greater the number of punctures or scores in the sheath the more rapid the rate of separation. As the uranium is oxidized the bond is broken and the sheath may be removed bodily. The steam is preferably applied under pressure.

The reaction is initiated at a temperature of 250° C. and the rate of reaction increases steadily until a temperature of 380° C. is reached. At a temperature of 400 to 420° C. the rate of separation has been found to decrease about 50%. The most efficient temperature for the separation is 340 to 380° C.

What is claimed is:

1. A method of desheathing uranium fuel rods sheathed in zirconium or an alloy of it which comprises scoring the sheath to expose the uranium core, treating the fuel rod with steam at a temperature not substantially less than 250° C. to oxidize the uranium and continuing the steam treatment until the sheath has been freed from the uranium core.

2. The method defined in claim 1 wherein the steam treatment is effected at a temperature not substantially exceeding 420° C.

3. The method defined in claim 1 wherein the steam treatment is effected at a temperature of 340 to 380° C.

4. The method defined in claim 1 wherein the steam is applied under pressure.

5. A method of removing zirconium alloy sheaths from uranium fuel rods which comprises puncturing the sheath to expose the uranium core, subjecting the fuel rod to steam under pressure at a temperature of 340 to 380° C. to oxidize the uranium core and continuing the steam treatment until the core is separated from the sheath.

No references cited.